US010632462B2

(12) United States Patent
Issadore et al.

(10) Patent No.: US 10,632,462 B2
(45) Date of Patent: Apr. 28, 2020

(54) APPARATUS AND METHODS FOR MANUFACTURING A MICROFLUIDIC DEVICE

(71) Applicant: The Trustees of the University of Pennsylvania, Philadelphia, PA (US)

(72) Inventors: David Issadore, Philadelphia, PA (US); Melaku Muluneh Woldermariam, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 175 days.

(21) Appl. No.: 15/510,017

(22) PCT Filed: Sep. 15, 2015

(86) PCT No.: PCT/US2015/050144
§ 371 (c)(1),
(2) Date: Mar. 9, 2017

(87) PCT Pub. No.: WO2016/044244
PCT Pub. Date: Mar. 24, 2016

(65) Prior Publication Data
US 2017/0304825 A1 Oct. 26, 2017

Related U.S. Application Data

(60) Provisional application No. 62/050,452, filed on Sep. 15, 2014.

(51) Int. Cl.
*B01L 3/00* (2006.01)
*B81B 1/00* (2006.01)
(Continued)

(52) U.S. Cl.
CPC ... *B01L 3/502707* (2013.01); *B01L 3/502715* (2013.01); *B01L 3/502761* (2013.01);
(Continued)

(58) Field of Classification Search
CPC ............ B01L 2200/02; B01L 2200/12; B01L 2200/143; B01L 2300/02;
(Continued)

(56) References Cited

U.S. PATENT DOCUMENTS 6,443,179 B1 * 9/2002 Benavides ................ F15C 5/00
137/454.2
6,632,400 B1 * 10/2003 Brennen ........... B01L 3/502707
204/452
(Continued)

OTHER PUBLICATIONS

International Search Report and Written Opinion of the International Searching Authority for International Application No. PCT/US2015/050144, dated Dec. 11, 2015, 8 pages.

*Primary Examiner* — Jennifer Wecker
(74) *Attorney, Agent, or Firm* — BakerHostetler

(57) ABSTRACT

A microfluidic device includes an integrated circuit and a first substrate layer having a first surface and a second surface. The first surface of the first substrate layer is connected to the integrated circuit. The first substrate layer is in fluid communication with the integrated circuit. The microfluidic device also includes a second substrate layer having a surface area substantially larger than that of the first substrate layer. The second substrate layer includes a first and second surface. The first surface of the second substrate layer is connected to the second surface of the first substrate layer. The second substrate layer includes a first fluid inlet. The second substrate layer is in fluid communication with the integrated circuit through the first substrate layer.

25 Claims, 7 Drawing Sheets

(51) Int. Cl.
  *B81B 7/00* (2006.01)
  *F15C 5/00* (2006.01)
  *G01N 27/12* (2006.01)
  *F15C 7/00* (2006.01)
  *B81B 7/02* (2006.01)

(52) U.S. Cl.
  CPC ...... *B01L 3/502776* (2013.01); *G01N 27/128* (2013.01); *B01L 2200/02* (2013.01); *B01L 2200/12* (2013.01); *B01L 2200/143* (2013.01); *B01L 2300/02* (2013.01); *B01L 2300/0627* (2013.01); *B01L 2300/0816* (2013.01); *B01L 2300/0887* (2013.01)

(58) Field of Classification Search
  CPC ..... B01L 2300/0627; B01L 2300/0816; B01L 2300/0887; B01L 3/502707; B01L 3/502715; B01L 3/502761; B01L 3/502776; G01N 27/128
  See application file for complete search history.

(56) References Cited

U.S. PATENT DOCUMENTS

| | | | |
|---|---|---|---|
| 2001/0052770 A1* | 12/2001 | Simmonds | B82Y 15/00 324/204 |
| 2004/0037739 A1* | 2/2004 | McNeely | B01F 5/10 422/417 |
| 2009/0178751 A1 | 7/2009 | Presley et al. | |
| 2009/0314367 A1* | 12/2009 | McAvoy | B81C 1/00253 137/828 |
| 2013/0149215 A1 | 6/2013 | Dekker et al. | |
| 2013/0156658 A1* | 6/2013 | Shim | B01L 3/502707 422/504 |
| 2016/0220995 A1* | 8/2016 | Atashbar | B29C 65/4835 |

* cited by examiner

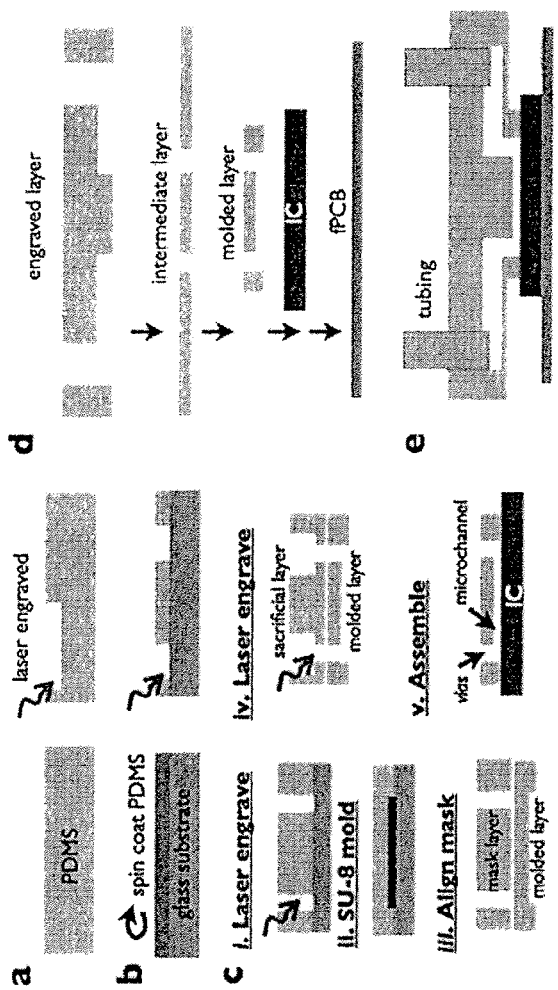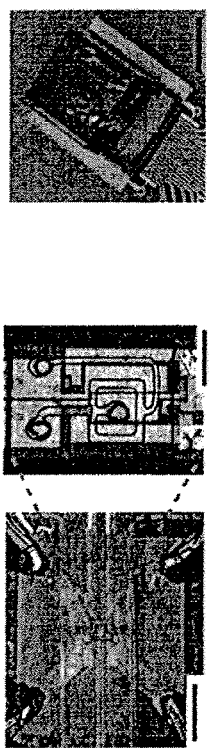
FIGs. 5a-e
FIG. 5f  FIG. 5g
FIG. 5h

APPARATUS AND METHODS FOR MANUFACTURING A MICROFLUIDIC DEVICE

CROSS REFERENCE TO RELATED APPLICATIONS

This application is a National Phase Application of PCT Application No. PCT/US2015/050144, filed Sep. 15, 2015 and claims priority to U.S. Provisional Patent Application No. 62/050,452, filed Sep. 15, 2014, the disclosure of which is incorporated herein by reference in its entirety for all purposes.

FIELD OF THE INVENTION

This invention relates to the field of microfluidics and, more particularly, microfluidic devices and methods of making the same.

BACKGROUND OF THE INVENTION

Hybrid integrated circuit/microfluidic chips harness the nano-scale feature size, the programmability, and the GHz clock rates of modern semiconductor technology and combine them with the biocompatibility of microfluidics. Utilizing this approach, chips have been developed for the programmable dielectric and magnetic control of cells, detection of sparse soluble biomarkers, and the sensing of rare. While these chips have performed well in laboratory settings, a major hurdle to their further development is the inherent size mismatch between integrated circuits ("ICs") (~mm) and microfluidic chips (~cm). Millimeter-sized ICs can be built with great functionality, primarily because of the nanoscale-features of modern ICs, which allow for enormously dense circuitry. Increasing the area of an IC to match the size of the microfluidic chip (~100× increase in area), as has often been done in previous studies leads to a waste of valuable space on the IC, greatly increasing fabrication cost (>100×).

SUMMARY OF THE INVENTION

Aspects of the invention relate to microfluidic devices, as well as methods of manufacturing a microfluidic device.

In accordance with one aspect, the invention provides a microfluidic device. The microfluidic device includes an integrated circuit. A first substrate layer having a first surface and a second surface is connected to the integrated circuit and is in fluid communication with the integrated circuit. A second substrate layer having a surface area substantially larger than that of the first substrate layer, and having a first and second surface is connected to the second surface of the first substrate layer. The second substrate layer includes a first fluid inlet and is in fluid communication with the integrated circuit through the first substrate layer.

In accordance with another aspect, the invention provides an apparatus. The apparatus includes an inventive microfluidic device which is configured to detect an analyte. The apparatus also includes circuitry coupled to the microfluidic device to communicate information relating to the analyte to a user.

In accordance with yet another aspect, the invention provides an apparatus for detecting tumor cells and other pathogens. The apparatus includes an inventive microfluidic device. The integrated circuit of the inventive microfluidic device includes a differential giant magnetoresistance sensor configured to detect a magnetic analyte. The apparatus also includes circuitry coupled to the microfluidic device to communicate information relating to the magnetic analyte to a user.

In accordance with still another aspect, the invention provides a method of manufacturing a microfluidic device. The method includes the steps of defining a microfluidic channel in a top substrate layer; defining one or more vias through bottom substrate layer; defining a flow focusing channel in the bottom substrate layer; aligning the top substrate layer and the bottom substrate layer such that the microfluidic channel, the vias, and the flow focusing channel are in fluid communication; and bonding together the aligned top substrate layer, the bottom substrate layer, and an integrated circuit.

In accordance with still another aspect, the invention provides a microfluidic device. The microfluidic device includes an integrated circuit. A first substrate layer is connected to the integrated circuit. The first substrate layer includes at least two vias spaced apart by a first distance, and the at least two vias are in fluid communication with the integrated circuit. A second substrate layer is connected to the first substrate layer. The second substrate layer includes at least two fluid ports spaced apart by a second distance. The second distance is substantially larger than the first distance. The at least two ports are in fluid communication with the integrated circuit through the at least two vias.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures:

FIG. 5a is a schematic illustration of a step for manufacturing a microfluidic device according to aspects of the present invention;

FIG. 5b is a schematic illustration of a step for manufacturing a microfluidic device according to aspects of the present invention;

FIG. 5c is a schematic illustration of a step for manufacturing a microfluidic device according to aspects of the present invention;

FIG. 5d is a schematic illustration of a step for manufacturing a microfluidic device according to aspects of the present invention;

FIG. 5e is a schematic illustration of a step for manufacturing a microfluidic device according to aspects of the present invention;

FIG. 5f is a photograph of a microfluidic device according to aspects of the present invention;

FIG. 5g is a photograph of a microfluidic device according to aspects of the present invention;

FIG. 5h is a photograph of a microfluidic device according to aspects of the present invention;

DETAILED DESCRIPTION OF THE INVENTION

Figure 1:
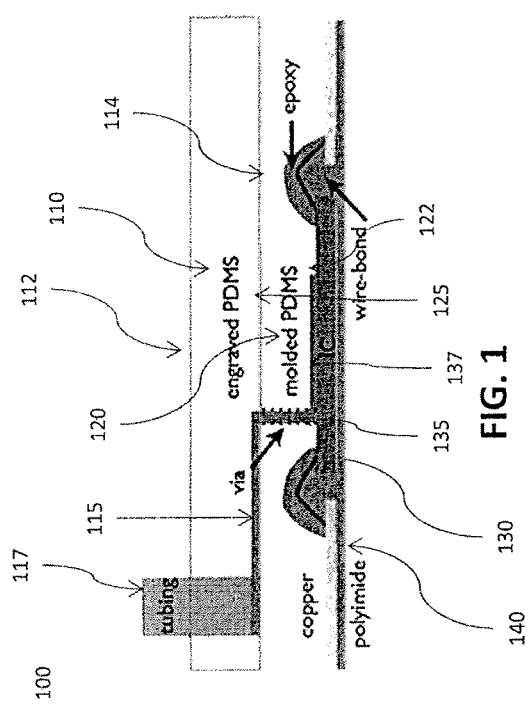
FIG. 1 is a schematic illustration of a microfluidic device according to aspects of the present invention.

Aspects of the invention relate to dosimeters, as well as methods of determining an effect of delivering ionizing radiation with a dosimeter.

The inventors have recognized that it would be useful to provide a microfluidic device including three dimensional chip that better straddles the multiple length scales of hybrid integrated circuit/microfluidic chips. The inventors have further recognized, using the inventive microfluidic device, that multiple integrated circuits can be integrated into a single substrate, enabling integrated circuits to be used in parallel for increased throughput or in series, enabling various types of integrated circuits for increased functionality. The inventors have also recognized that, using the inventive microfluidic device, there is no need for post-processing or additional lithography on the integrated circuit as has been necessary in previous efforts, allowing the technique to be seamlessly extended to many different types of integrated circuits. The inventors have also recognized that fluidic channels with micrometer-scale resolution can be defined directly over the surface of the integrated circuit, enabling accurate micrometer-scale control of fluids directly over micrometer-scale sensors and actuators, offering an improvement over the millimeter-scale "bath-tub" channels used in previous studies. Finally, the inventors have recognized that the portions of the microfluidic device may be manufactured from materials such as PDMS, resulting in reduced manufacturing costs.

Minimizing the size of integrated circuits is desirable because the cost of an integrated circuit is a function of the area of the die $A_{IC}$. This relationship is attributable to at least two reasons: 1) Because the cost per wafer is constant, the larger the area of the integrated circuit then the fewer integrated circuits can be made per wafer; and 2) Because defect density across the wafer is constant, the larger the area of the die $A_{IC}$ the lower its manufacturing yield will be. Due to these factors, the cost of an IC $\$_{IC}$ scales $\$_{IC} \propto A_{IC}^{\alpha}$, where $\alpha=2$-3.

Microfluidics tend to be much larger than integrated circuits for at least two reasons: 1) The features of microfluidic chips are typically >100× larger than that of an integrated circuit (>1 µm); and 2) The fluid inputs and outputs to microfluidics are macroscopically machined millimeter-sized pieces, often taking up a significant fraction of the footprint of a microfluidic device. These two factors cause microfluidic chips to be difficult to shrink below 1 $cm^2$.

FIG. 1a depicts a schematic illustration of a cross-section of microfluidic device 100 according to the present invention. Microfluidic device 100 includes an integrated circuit 130. Integrated circuit 130 may include logic for sensing or modifying a variety of properties including, but not limited to temperature; flow rate or velocity; pressure, fluid, sample or analyte presence or absence, concentration, amount, mobility, or distribution; an optical characteristic; an acoustic characteristic; a magnetic characteristic; an electrical characteristic (such as a Hall effect); electric field strength, disposition, or polarity. For example, integrated circuit 130 may include a giant magnetoresistance sensor, a dielectric sensor, a dielectric cellular controller, an optical sensor, and a Hall effect sensor Integrated circuit may be electrically connected to substrate 140. In one embodiment, substrate 140 is a flexible printed circuit board.

Microfluidic device 100 also includes a first substrate layer 120 having a first surface 122 and a second surface 125. Exemplary substrate materials include glass, silicon, silicon on insulator ("SOI") silicon dioxide, mylar, polysiloxanes, or carbon-based polymers including, but not limited to polydimethylsiloxane ("PDMS"), a polyacrlyamide, a polyacrylate, a polymethacrylate or a mixtures thereof. First surface 122 of first substrate layer 120 is connected to integrated circuit 130. In one embodiment, first substrate layer 120 and integrated circuit 130 have a substantially similar surface area.

First substrate layer 120 is additionally in fluid communication with integrated circuit 130. In one embodiment, this fluid communication is achieved through microfluidic channel 137, which may be a flow focusing channel. Microfluidic channel 137 may be formed in first substrate layer 120 through any method known to one of ordinary skill in the art, including laser micromachining and soft lithography. It is desirable that the method used to form microfluidic channel 137 permit fluid to be delivered to integrated circuit 130 with micrometer-scale resolution. That is, microfluidic channel 137 may desirably have a diameter of 1-500 µm. This micrometer-scale resolution allows fluid passing through microfluidic channel 137 to be controlled with high accuracy and brought into close proximity to sensors of integrated circuit 130 for highly sensitive measurements.

In one embodiment, microfluidic channel 137 is formed through soft lithography. One of ordinary skill in the art, upon reading this disclosure, will understand that the use of soft lithography enables micrometer-scale microfluidic channel 137 to be incorporated onto the surface of integrated circuit 130, as opposed to a millimeter-scale "bath-tub" channels used in previous studies. These lithographically defined channels allow the position of an analyte (e.g., cells suspended in a fluid) to be controlled with high accuracy and for them to be brought into close proximity to sensors of integrated circuit 130 for highly sensitive measurement.

Suitable analytes include, but are not limited to, emulsions (e.g., water-in-oil, oil-in-water, water-in-oil-in-water), vesicles, microbubbles, beads (e.g. magnetic polymer beads), cells (e.g., tumor cells), pathogens, sparse biomarkers, DNA, RNA, nucleic acids, pollutants, and the like.

A second substrate layer 110 includes a first surface 114 and a second surface 112. Second substrate layer 110 may be formed of the same or different materials as first substrate layer 120. Second substrate layer 110 has a surface area which is substantially larger (e.g., greater than 300%) than the surface area of first substrate layer 120. First surface 114 of second substrate layer 110 is connected to second surface 125 of first substrate layer 120.

Second substrate layer 110 includes at least one fluid inlet 117. Fluid inlet 117 connects microfluidic device 100 to external fluid sources. For example, fluid inlet 117 may contain a sample or analyte to be sensed by integrated circuit 130.

Figure 2:
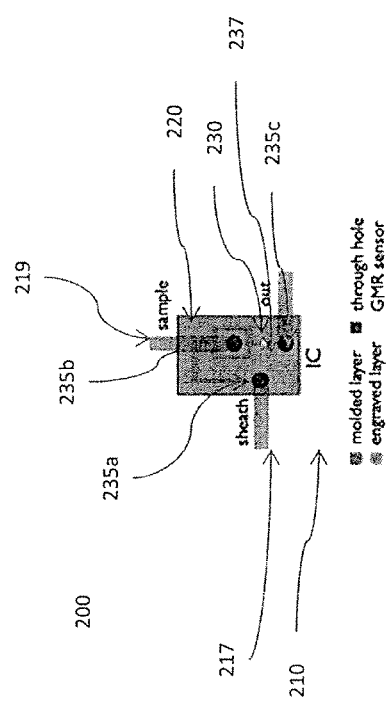
FIG. 2 is a schematic illustration of a microfluidic device according to aspects of the present invention.

In one embodiment, as depicted by FIG. 2, second substrate layer 110 includes multiple fluid inlets 217 and 219. Fluid inlet 219 is the source of a fluid containing a sample to be sensed by integrated circuit 230. Fluid inlet 219 supplies the fluid containing the sample through via 235b, into first substrate layer 220, and into close proximity of the sensor on integrated circuit 230.

Fluid inlet 217 is the source of a sheath liquid used to direct the flow of the fluid bearing the sample supplied by fluid inlet 219. Fluid inlet 217 supplies a sheath liquid through via 235b into first substrate layer 220. That is, the co-flow of a sheath fluid causes the sample (e.g., a suspension of cells or beads) to be pushed towards the center of microfluidic channel 237. Flow focusing has utility for detecting cells in-flow because it can be used to force cells to pass in close proximity of the sensor for maximum sensitivity. Additionally, flow focusing allows microfluidic channel 237 to be much larger than the size of the cells, effectively reducing the fluidic resistance and thus the risk of clogging.

Turning back to FIG. 1a, a microfluidic channel 115 defined in second substrate layer 110 is in fluid communication with fluid inlet 117. Similar to fluid channel 117, microfluidic channel 115 may be formed in first substrate layer 120 through any method known to one of ordinary skill in the art, including laser micromachining and soft lithography.

In one embodiment, microfluidic channel 115 is laser engraved into second substrate layer 110. Using laser micromachining permits deeply engraved (e.g. h~50 μm to 1 mm) microfluidic channel 115, which may be utilized to supply microfluidic channel 137. The low hydrodynamic resistance of these channels ensure that microfluidic channel 137 are driven with uniform pressures.

Second substrate layer 110 is in fluid communication with integrated circuit 130 through first substrate layer 120. In one embodiment, one or more vias 135 defined in first substrate layer 120 allow fluid communication among second substrate layer 110, first substrate layer 120, and integrated circuit 130. Micrometer-sized vias 135 allow multiple fluid inlets and outlets to channel 137, without consuming the valuable space on integrated circuit 130 that conventional millimeter-sized punched holes would occupy.

Laser micromachining may be used to create vias 135 to connect second substrate layer 110 and first substrate layer 120 in fluid communication. Vias 135 preferably have a diameter ranging from 50 μm to 100 μm.

Figure 3B:
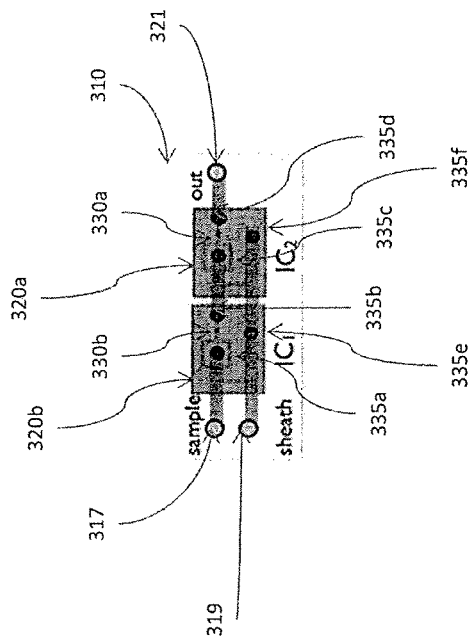
FIG. 3b is a schematic illustration of a microfluidic device according to aspects of the present invention.
Figure 3D:
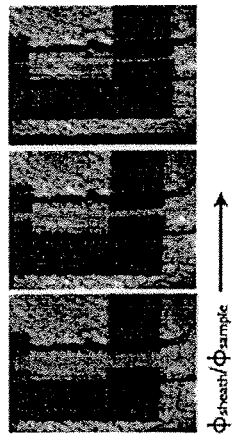
FIG. 3d is a collection of fluorescence micrographs superimposed on a brightfield image showing flow focusing of water stained with rhodamine on a microfluidic device according to aspects of the present invention.
Figure 3A:
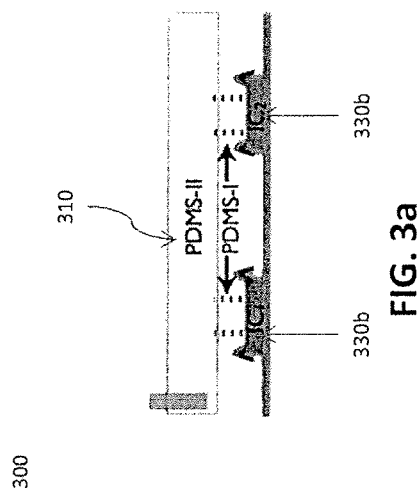
FIG. 3a is a schematic illustration of a microfluidic device according to aspects of the present invention.

Turning next to FIG. 3a, a schematic illustration of a cross-section of microfluidic device 300 according to the present invention is shown. In this embodiment, second substrate layer 310 may be connected to a plurality of first substrate layers (320a, 320b). Each of the plurality of first substrate layers (320a, 320b) may be connected to an integrated circuit (330a, 330b).

According to this embodiment, multiple integrated circuits (330a, 330b) may be run in parallel or in series, enabling microfluidic device 300 to incorporate integrated circuits having a variety of functionality. For example, multiple chips with different functionality can be integrated, such as dielectric sensing, heating, magnetic sensing, or acoustic sorting. This ability to incorporate multiple integrated circuits, enables monolithic microfluidic platforms that include integrated circuits manufactured with incompatible processes, such as CMOS for dielectric sensors, specialized high voltage processes for dielectric control of cells, or GaAs for Hall effect sensors. With the rapid development of new capabilities in integrated circuits based sensing and in microfluidics, this hybrid IC/microfluidic architecture can help incorporate advances from both fields into commercially practical platforms.

The integration of multiple integrated circuits into a single microfluidic device 300 can enable highly parallelized processing of samples. This functionality may be particularly useful for magnetic cytometry, which has previously been used for the highly sensitive detection of rare cells. Because these cytometers must measure cells one at a time, they are ultimately limited by the maximum flow velocity that a cell can be moved through a microfluidic channel. By placing sensors in parallel, the throughput of these cytometers can be scaled linearly with the number of chips. Making an analogy to computers, the millimeter-sized integrated circuit 130 and bottom substrate layer 120 act as the CPUs, housing small feature-sizes and dense functionality, and the larger top substrate layer 110 acts as the motherboard, connecting multiple chips and providing access to the outside world.

FIG. 3b depicts a schematic illustration of a cross-section of microfluidic device 300 according to the present invention in which integrated circuits (330a, 330b) are run in series. A fluid containing a sample is supplied to fluid inlet 317 and flows through a channel in second substrate layer 310, through via 335a, and into first substrate layer 320b. From there, the sample containing fluid is joined by a sheath fluid, supplied by fluid inlet 319 through via 335e, and the co-flow passes over the sensor of integrated circuit 330b. The co-flow exits first substrate layer 320b into second substrate layer 310 through via 335b. The co-flow then enters first substrate layer 320a through via 335c. From there, the co-flow is joined by additional sheath fluid, supplied by fluid inlet 319 through vias 335e and 335f, and the co-flow passes over the sensor of integrated circuit 330a. Finally, the co-flow exits first substrate layer 320a through via 335d and then exits second substrate layer 310 through fluid outlet 321.

In another embodiment according to the present invention, a microfluidic device is provided. The microfluidic device includes an integrated circuit (FIG. 2; 230). A first substrate layer (FIG. 2; 220) is connected to the integrated circuit (FIG. 2; 230). The first substrate layer (FIG. 2; 220) includes at least two vias (FIG. 2; 235a-c) spaced apart by a first distance. The at least two vias (FIG. 2; 235a-c) are in fluid communication with the integrated circuit (FIG. 2; 230).

A second substrate layer (FIG. 2; 210) is connected to the first substrate layer (FIG. 2; 220). The second substrate layer (FIG. 2; 210) includes at least two fluid ports (FIG. 2; 217, 219) spaced apart by a second distance. The second distance is substantially larger than the first distance (e.g., the second distance is &&&% greater than the first distance). The at least two ports (FIG. 2; 217, 219) are in fluid communication with the integrated circuit (FIG. 2; 230) through the at least two vias (FIG. 2; 235a-c).

In yet another embodiment according to the present invention, an apparatus is provided. The apparatus includes an inventive microfluidic device, such as any of the microfluidic devices (FIGS. 1-3; 100, 200, 300) described above. The microfluidic device is configured sensing or modifying a variety of properties including, but not limited to temperature; flow rate or velocity; pressure, fluid, sample or analyte presence or absence, concentration, amount, mobility, or distribution; an optical characteristic; an acoustic characteristic; a magnetic characteristic; an electrical characteristic (such as a Hall effect); electric field strength, disposition, or polarity.

In one embodiment, microfluidic device (e.g., FIG. 1; 100) includes an integrated circuit (FIG. 1; 130) having a differential giant magnetoresistance sensor configured to detect a magnetic analyte.

The apparatus also includes circuitry coupled to the microfluidic device to communicate information relating to the detection to a user. For example, the communication may include a user notification regarding, e.g., the presence, absence, amount, or concentration of a particular analyte.

Figure 4:
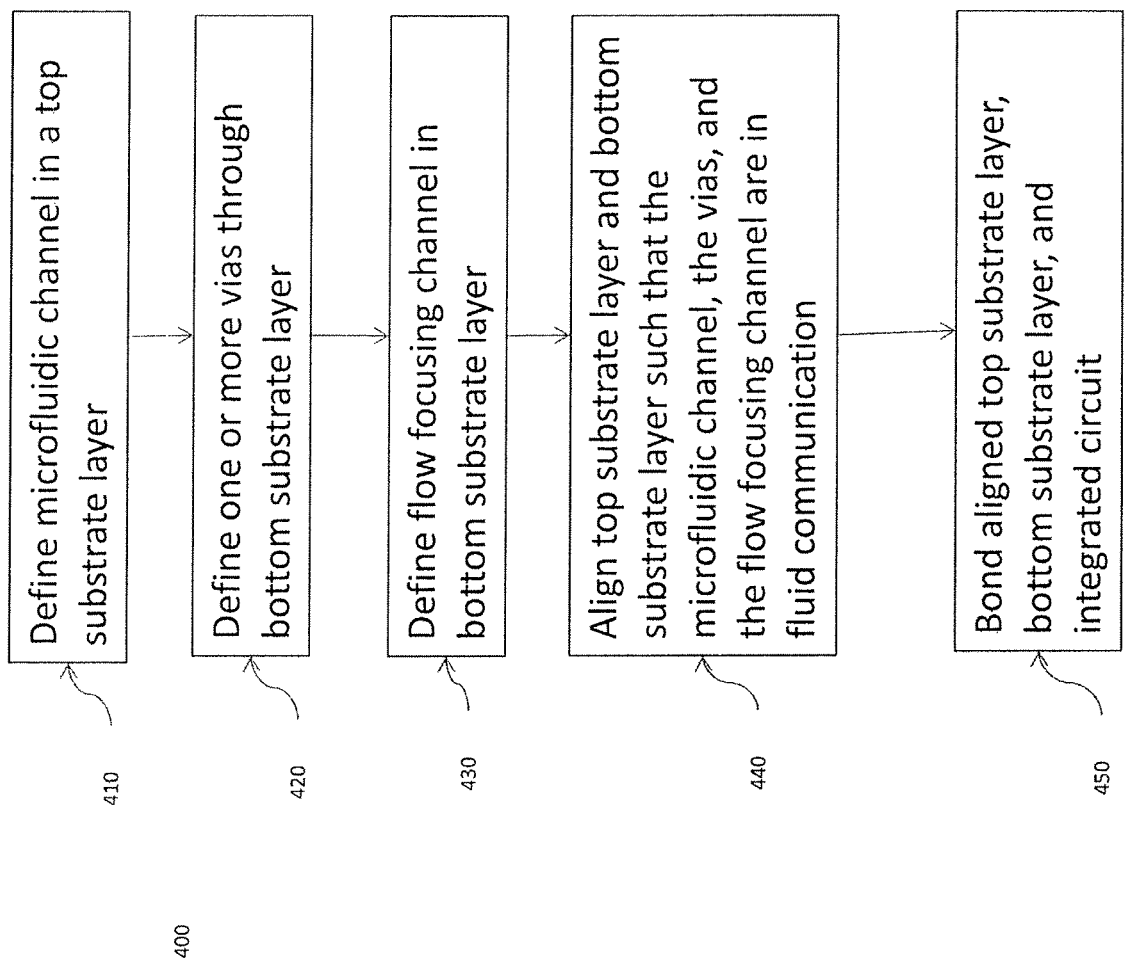
FIG. 4 is a flow diagram of a method of manufacturing a microfluidic device according to aspects of the present invention.

Turning to FIG. 4, a flow diagram depicting selected steps of a process 400 for manufacturing a microfluidic device according to aspects of the present invention is shown. It should be noted that, with respect to the methods described herein, it will be understood from the description herein that one or more steps may be omitted and/or performed out of the described sequence of the method (including simultaneously) while still achieving the desired result.

In step 410, a microfluidic channel (e.g., FIG. 1; microfluidic channel 115) is defined in a top substrate layer (e.g. FIG. 1; substrate layer 110).

In step 420, one or more vias (e.g., FIG. 1; via 135) are defined through a bottom substrate layer (e.g., FIG. 1; substrate layer 120).

In step 430, a flow focusing channel (e.g., FIG. 1; microfluidic channel 137) is defined in the bottom substrate layer (e.g., FIG. 1; substrate layer 120).

As described above, the microfluidic channel (e.g., FIG. 1; microfluidic channel 115), the vias (e.g., FIG. 1; via 135), and the flow focusing channel (e.g., FIG. 1; microfluidic channel 137) may be defined in steps 410-430 respectively using any method known to one of ordinary skill in the art, including laser micromachining and soft lithography.

In a preferred embodiment, the microfluidic channel (e.g., FIG. 1; microfluidic channel 115) is defined using laser engraving, and the bottom substrate layer (e.g., FIG. 1; substrate layer 120) is formed from a soft lithography molded layer.

In step 440, the top substrate layer (e.g. FIG. 1; substrate layer 110) and the bottom substrate layer (e.g., FIG. 1; substrate layer 120) are aligned such that the microfluidic channel (e.g., FIG. 1; microfluidic channel 115), vias (e.g., FIG. 1; via 135), and the flow focusing channel (e.g., FIG. 1; microfluidic channel 137) are in fluid communication.

In step 450, the aligned top substrate layer (e.g. FIG. 1; substrate layer 110) and bottom substrate layer (e.g., FIG. 1; substrate layer 120) and an integrated circuit (e.g., FIG. 1; integrated circuit 130) are bonded together. For example, one method of bonding these elements together is by stamping them into spin-coated uncured PDMS on a Si wafer, aligning the pieces together under a stereoscope with a mask aligner, and baking.

In some embodiments, the integrated circuit (e.g., FIG. 1; integrated circuit 130) is electrically connected to a substrate, such as a printed circuit board (e.g., FIG. 1; circuit board 140). As described above, the integrated circuit (e.g., FIG. 1; integrated circuit 130) connects electronically to the outside world through a custom flexible printed circuit board (e.g., FIG. 1; circuit board 140) upon which it is mounted.

Examples

An in-flow magnetic cytometer consisting of commercial sub mm-sized integrated circuits with an integrated GMR sensing circuit. On top of the integrated circuits are microfluidics with flow focusing features to direct cells or beads to the GMR sensors. The hybrid chip is 5×5 $cm^2$ and the integrated circuits are 565×1145 $\mu m^2$. The functionality of the magnetic cytometer was demonstrated by detecting individual 8.43 μm diameter iron oxide loaded polystyrene beads in-flow. To highlight the capability of integrating multiple ICs into a single PDMS chip, a device was fabricated that included two of these GMR sensing chips connected in series.

Hybrid Soft Lithography/Laser Engraved PDMS Fabrication Method

To incorporate millimeter-sized integrated circuits with centimeter-sized microfluidics, the fabrication strategy consisted of integrating three separate pieces of PDMS (FIG. 5a): 1) A millimeter-sized piece of PDMS with soft lithography defined microfluidic channels that were aligned and bonded directly to the surface of the integrated circuits. Vias were laser micromachined into this PDMS piece to connect to fluid channels in the centimeter-sized PDMS piece; 2) A centimeter-sized PDMS membrane with laser micromachined through-holes that lies between the millimeter-sized and the centimeter-sized PDMS pieces; and 3) A centimeter-sized PDMS piece with laser engraved microchannels that delivers fluid to the millimeter-sized PDMS piece and houses fluidic connections to the outside world. This centimeter-sized PDMS piece was supported at its edges with blocks of PDMS to keep it from bending due to gravity.

Each of the separate pieces of PDMS were bonded together by stamping them into spin-coated uncured PDMS on a Si wafer, aligning the pieces together under a stereoscope with a mask aligner, and baking (FIGS. 5d,e). This bonding technique created a robust, leak-proof seal of the microfluidic channels. Using this alignment tool, 50 μm diameter vias could be aligned with ±2 μm accuracy. All PDMS pieces were fabricated using PDMS (KR Anderson Company, Denver, Colo., Sylgard/elastomer kit).

The centimeter-sized PDMS piece was fabricated using direct laser micromachining. First, a 3 mm thick layer of PDMS was poured into a plastic petri dish and baked. This piece was then laser engraved with h=200 μm thick channels using raster-based laser patterning (FIG. 5a) with an infrared laser micromachining system (VLS3, VersaLaser). To fabricate the PDMS membrane, a 200 μm thick layer of PDMS was spin coated (ws-650mz-23npp, Laurell) on a Silicon wafer. This spin coated layer was then laser cut using vector-based laser patterning to make through holes. (FIG. 5b)

To fabricate the molded layer, standard single-layer SU-8 soft lithography (SU-8 2025, MicroChem, Westborough, Mass.) with h=30 μm thick features was used. On this mold, a 100 μm thick PDMS piece was created (FIG. 5c). Vias were laser micromachined into this piece that were aligned to the molded microfluidic channels. A sacrificial layer of PDMS was used as a mask to create these through-holes. To this end, a 300 μm thick PDMS sacrificial membrane was defined and subsequently aligned with the molded PDMS layer under a stereoscope using a mask aligner. Through-holes were then laser engraved through this mask. Because the sacrificial mask was thicker than the molded PDMS piece, it was able to protect the molded PDMS from the engraving laser except in the locations where the vias were defined. Using this technique, 50 μm diameter holes aligned with ±5 μm accuracy could be reliably created.

The integrated circuit sat on top of a flexible circuit board (fPCB), which provided electrical connections to the outside world. We fabricated the fPCB from Pyralux (DuPont, Wilmington, Del.), which consists of 25 μm of polyamide and 35 μm of copper. To pattern the electrodes, we printed an etch-barrier using a wax printer. (Phaser 8560) The copper was etched using Iron(III) Chloride. Following the etch, the PCB was soaked in acetone for 15 seconds to remove the wax. The copper electrodes were then gold plated (Transene, Immersion CF) to facilitate wire bonding to the IC. The IC was bonded to the PCB using epoxy (Gorilla Glue, Original, Cincinnati, Ohio), wirebonded (Singh Nanocenter, University of Pennsylvania), and the wire bonds were encased in epoxy using a cue tip. The purpose of the epoxy was to mechanically protect the wirebonds during the assembly of the chip with the PDMS microfluidics. Photographs of the device are depicted by FIGS. 5f-h. The scale bars are, respectively, (a) 1 cm (b) 1 cm (c) 400 μm.

Flow-Focusing onto the Surface of the IC

Figure 3C:
FIG. 3c is a fluorescence micrograph superimposed on a brightfield image showing flow focusing of water stained with rhodamine on a microfluidic device according to aspects of the present invention.

To demonstrate the utility of building micro-scale fluidics directly on top of the integrated circuit, hydrodynamic focusing was incorporated to direct fluid over a GMR sensor (FIG. 2). The inventors' microfluidic geometry caused the sample (i.e. a suspension of cells or beads) to be pushed towards the center of the channel by a co-flow of a sheath fluid (FIG. 3c). By changing the ratio of flow rates between the sample φsample and the sheath flow φsheath, the amount of focusing could be changed proportionally, as has been previously shown in the literature. (FIG. 3d) Flow was controlled using two syringe pumps (New Era, Farmingdale, N.Y., NE1000) and the flow was visualized by flow-focusing water dyed with rhodamine under an epi-fluorescence microscope. (Leica, Wetzlar, Germany, DM4000B) The devices were shown to be robust for multiple uses, and could be reset for future use by cleaning with isopropyl alcohol followed by placement into a desiccator or sterilized using an autoclave.

In-Flow Magnetic Detection

To demonstrate the utility of incorporating millimeter-sized integrated circuits into a microfluidic chip, a magnetic cytometer was built using a commercial differential giant magnetoresistance sensor (NVE Corporation, Eden Prairie, Minn.—AB001-01). Magnetic detection of cells in-flow has recently been demonstrated as a method to detect extremely sparse tumor cells and pathogens directly in unprocessed clinical samples.

Figure 6A:
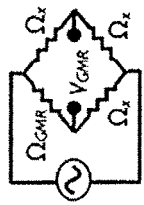
FIG. 6a is an illustration of a magnetically labeled bead passing over a GMR sensor according to aspects of the present invention.

The magnetic cytometer detects beads by measuring the local change in the magnetic field as each individual bead passed over the sensor. The GMR sensors were arranged in a differential Wheatstone Bridge geometry, and their direction-of-sensitivity was oriented to measure the magnetic field in-plane with the integrated. The chip sat in an external B field orthogonal to the IC's surface, provided by a permanent magnetic. The microfluidic channels directed each bead over a 59×38 μm$^2$ GMR sensor. As a bead passed over the GMR sensor, the component of its field in-plane with the IC caused an imbalance in the Wheatstone Bridge that could be measured (FIG. 6a). In particular, there was a local change in the magnetic field, which resulted in a change in resistance of the sensor $\Omega_{GMR}$. A 1" diameter, ½" thick NdFeB magnet and the chip were aligned using a custom machined acrylic piece, made using laser micromachining. The field strength at the location of the sensor was approximately 0.3 T, as measured with a Hall sensor (AlphaLab, Pittsburgh, Pa.).

Figure 6B:
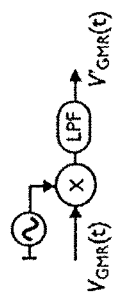
FIG. 6b is a schematic illustration of GMR sensors arranged in a differential Wheatstone Bridge geometry on an integrated circuit according to aspects of the present invention.
Figure 6C:
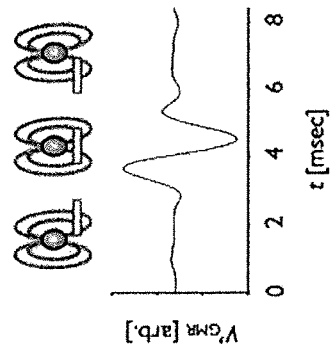
FIG. 6c is a schematic illustration of the demodulation of a signal according to aspects of the present invention.

The differential Wheatstone Bridge sensor geometry integrated onto the IC affords high sensitivity, and a tolerance for a common mode in-plane field (Bsat=175 G) between the sensors. (FIG. 6b) This tolerance allowed slight misalignments or inhomogeneities from the permanent magnet to be ignored. To maximize signal to noise, the Wheatstone Bridge circuit was driven with an AC voltage with a frequency of f=1 KHz. The passing of the bead caused a modulation of the amplitude of the AC voltage VGMR. The output of the GMR chip was AC coupled to a pre-amplifier (PA) with a gain of 20, and a high-pass frequency of fH=100 Hz and a low pass frequency of 3 kHz. (Ithaco, Brooktondale, N.Y.) The output of the PA was connected to an analog to digital converter, (National Instruments, Schnecksville, Pa. NI USB-6009) which digitized the signal at 40 kS/s before sending the signal to a computer over USB for analysis. The signal was demodulated in software (MATLAB), leading to a signal V'GMR where peaks corresponding to the passing of beads or cells could be readily distinguished (FIG. 6c).

Figure 6D:
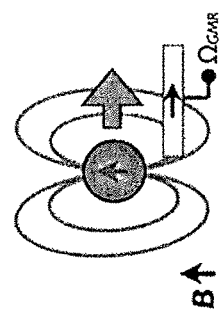
FIG. 6d is a graph depicting a demodulated signal according to aspects of the present invention.
Figure 6E:
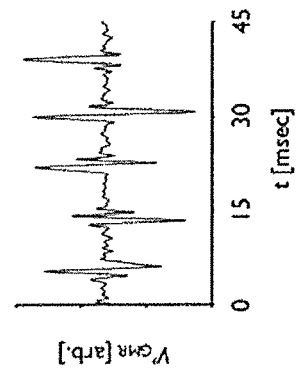
FIG. 6e is a graph depicting the signal of magnetic beads passing over a GMR sensor according to aspects of the present invention.

As a model system for cells, magnetically loaded 8.43 μm diameter polymer beads were detected in-flow. (Spherotech, Lake Forest, Ill., FCM-8052-2 Fluorescent Yellow Carboxyl Magnetic Particles) As each individual bead passed over the sensor, it lead to a distinct signal in the demodulated output V'GMR, allowing the passing of individual beads to be resolved (FIG. 6d). As each bead approached the GMR sensor, its in-plane fields lead to a positive change in the resistance (FIG. 6e). When the bead was directly over the sensor there was zero net in-plane field, which lead to a zero in the signal. As the bead was leaving the sensor area, its in-plane field lead to a negative change in the resistance. Thus, each passing bead lead to a distinct signal, a positive and a negative peak. The distance between these peaks enabled the beads velocity to be measured. Some variations in the shape of the signal from the passing beads was observed, which we suspect arose from the moment of the beads being slightly off-axis due to their rolling on the bottom of the channel, as has been reported in previous work.

Multi-Chip Integration

Figure 7C:
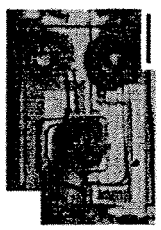
FIG. 7c is a photograph of a microfluidic device according to aspects of the present invention.
Figure 7B:
FIG. 7b is a photograph of a microfluidic device according to aspects of the present invention.
Figure 7A:
FIG. 7a is a photograph of a microfluidic device according to aspects of the present invention.

To highlight the capability of our technique to incorporate multiple millimeter-scale integrated circuits into PDMS based microfluidics, we integrated two of the GMR sensing chips in series (FIG. 7a). To this end, two millimeter-sized integrated circuit/PDMS chips were created and integrated them into a single centimeter-sized PDMS chip. The microfluidic chip had one sample input. The sample was delivered to the first integrated circuit, measured, and the output of the first integrated circuit was then the input of the second. Both integrated circuits shared the same source of sheath fluid, provided by a single channel that connected to the integrated circuits in a ladder geometry. The low resistance of the engraved channel enabled the sheath flow to be supplied to each of these chips at the same pressure for uniform operation. 29 Micrographs of this chip show its multiple size-scales, the centimeter-scale engraved PDMS layer and fPCB (FIG. 7a), the millimeter-sized integrated circuits (FIG. 7b), and the micrometer-sized fluid channels and GMR sensors (FIG. 7c). The performance of the individual GMR sensing chips were unaffected by the multi-chip integration. The scale bars for FIGS. 7a-c are 2 mm, 1 mm, and 500 μm respectively.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A microfluidic device, comprising:
   an integrated circuit;
   a first substrate layer having a first surface and a second surface,
   the first surface of the first substrate layer being connected to the integrated circuit,
   the first substrate layer comprising a via and a sample fluid channel formed therein, the via in fluid communication with the sample fluid channel, and
   the sample fluid channel being configured so as to define a sampling region therein such that fluid disposed within the sampling region is analyzed by the integrated circuit; and
   a second substrate layer having a surface area substantially larger than that of the first substrate layer,
   the second substrate layer having a first and second surface,
   the first surface of the second substrate layer bonded directly to the second surface of the first substrate layer,
   the second substrate layer having a first fluid inlet,
   the second substrate layer comprising a fluid channel, the fluid channel of the second substrate being in fluid communication with the via of the first substrate layer such that the first fluid inlet of the
   second substrate layer is in fluid communication with the integrated circuit through the first substrate layer.

2. The microfluidic device of claim 1, wherein the integrated circuit is electronically connected to a printed circuit board.

3. The microfluidic device of claim 1, wherein the vias has a diameter ranging from 50 μm to 100 μm.

4. The microfluidic device of claim 1, further comprising a microfluidic channel defined in the second substrate layer, the microfluidic channel in fluid communication with the first fluid inlet and the one or more vias.

5. The microfluidic device of claim 1, wherein the second substrate layer is connected to a plurality of first substrate layers, and wherein each of the plurality of first substrate layers is connected to an integrated circuit.

6. The microfluidic device of claim 5, wherein the plurality of integrated circuits are in fluid communication with one another.

7. The microfluidic device of claim 1, wherein the integrated circuit includes logic for sensing or modifying one or more of temperature, flow rate, flow velocity, pressure, an analyte presence, an analyte absence, concentration, amount, mobility, distribution, an optical characteristic, an acoustic characteristic, a magnetic characteristic, an electrical characteristic, electric field strength, disposition, and polarity.

8. The microfluidic device of claim 5, wherein each integrated circuit includes one or more of a magnetic sensor, a dielectric sensor, a dielectric cellular controller, an optical sensor, an acoustic sorter, a heating unit, and a Hall effect sensor.

9. The microfluidic device of claim 4, further comprising a second fluid inlet in fluid communication with the microfluidic channel, therein the first fluid inlet supplies an analyte and the second fluid inlet supplies a flow-focusing fluid.

10. The microfluidic device of claim 1, wherein the first substrate layer is a soft lithography molded layer.

11. The microfluidic device of claim 4, wherein the microfluidic channel is laser engraved into the second substrate layer.

12. The microfluidic device of claim 1, wherein the first substrate layer and the second substrate layer are comprised of a polymer selected from the group consisting of a polysiloxane, a carbon-based polymer or mixtures thereof.

13. The microfluidic device of claim 12 wherein the polymer is selected from the group consisting of polydimethylsiloxane, a polyacrlyamide, a polyacrylate, a polymethacrylate, or a mixture thereof.

14. The microfluidic device of claim 12, wherein the first substrate layer and the second substrate layer are comprised of different polymers.

15. The microfluidic device of claim 1, wherein the first substrate layer and the integrated circuit have a substantially similar surface area.

16. An apparatus comprising:
   the microfluidic device of claim 1, wherein the microfluidic device is configured to detect an analyte; and
   circuitry coupled to the microfluidic device to communicate information relating to the analyte to a user.

17. An apparatus for detecting tumor cells and other pathogens comprising:
   the microfluidic device of claim 1, wherein the integrated circuit includes a differential giant magnetoresistance sensor configured to detect a magnetic analyte; and
   circuitry coupled to the microfluidic device to communicate information relating to the magnetic analyte to a user.

18. A method of manufacturing a microfluidic device, the method comprising:
   defining a microfluidic channel in a top substrate layer;
   defining one or more vias through a bottom substrate layer;
   defining a flow focusing channel in the bottom substrate layer;
   aligning the top substrate layer and the bottom substrate layer such that the microfluidic channel, the vias, and the flow focusing channel are in fluid communication; and
   bonding directly together the aligned top substrate layer, the bottom substrate layer, and an integrated circuit.

19. The method of claim 18, further comprising electrically connecting the integrated circuit to a printed circuit board.

20. The method of claim 18, wherein the microfluidic channel is defined using laser engraving.

21. The method of claim 18, wherein the bottom layer is a soft lithography molded layer.

22. A microfluidic device comprising:
   a first substrate layer configured for connection to an integrated circuit, the first substrate layer including at least two vias spaced apart by a first distance, wherein the at least two vias are configured for fluid communication with the integrated circuit; and
   a second substrate layer directly bonded to the first substrate layer, the second substrate layer having at least two fluid ports spaced apart by a second distance, wherein the second distance is substantially larger than the first distance, wherein the at least two ports are configured for fluid communication with the integrated circuit through the at least two vias.

23. The microfluidic device of claim 1, wherein the first substrate layer further comprises a sheath fluid channel, the sheath fluid channel being in fluid communication with the sampling region of the sample fluid channel of the first substrate layer.

24. The microfluidic device of claim 23, wherein the second substrate layer comprises a sheath fluid inlet in fluid communication with the sheath fluid channel of the first substrate layer.

25. A microfluidic device, comprising:
   an integrated circuit;
   a first substrate layer, the first substrate layer comprising a sample fluid channel formed thereon,
   the sample fluid channel having an inlet, and
   the sample fluid channel being configured so as to define a sampling region therein such that fluid disposed within the sampling region is analyzed by the integrated circuit;
   an intermediate layer, the intermediate layer comprising a via in fluid communication with the inlet of the sample fluid channel of the first substrate layer; and
   a second substrate layer, the second substrate layer comprising an inlet and a fluid channel formed therein, the fluid channel being in fluid communication with the inlet and in fluid communication with the via of the intermediate layer,
   the first substrate layer being bonded directly to the intermediate layer, and the intermediate layer being bonded directly to the second substrate layer.

* * * * *

UNITED STATES PATENT AND TRADEMARK OFFICE
CERTIFICATE OF CORRECTION

PATENT NO. : 10,632,462 B2
APPLICATION NO. : 15/510017
DATED : April 28, 2020
INVENTOR(S) : Issadore et al.

Page 1 of 1

It is certified that error appears in the above-identified patent and that said Letters Patent is hereby corrected as shown below:

In the Claims

Under Claim no. 3, Column no. 11, Line no. 55, Replace:
"The microfluidic device of claim 1, wherein the vias has"
With:
--The microfluidic device of claim 1, wherein the via has--

Under Claim no. 12, Column no. 12, Line no. 26, Replace:
"polysiloxane, a carbon-based polymer or mixtures thereof."
With:
--polysiloxane, a carbon-based polymer, or mixtures thereof.--

Signed and Sealed this
Eleventh Day of August, 2020

Andrei Iancu
*Director of the United States Patent and Trademark Office*